(12) United States Patent
Okuhira et al.

(10) Patent No.: US 7,189,770 B2
(45) Date of Patent: Mar. 13, 2007

(54) CURING COMPONENT AND CURABLE RESIN COMPOSITION CONTAINING THE CURING COMPONENT

(75) Inventors: Hiroyuki Okuhira, Kanagawa Prefecture (JP); Akihito Kanemasa, Kanagawa Prefecture (JP); Hiroyuki Hosoda, Kanagawa Prefecture (JP)

(73) Assignee: The Yokohama Rubber Co., Ltd. (JP)

( * ) Notice: Subject to any disclaimer, the term of this patent is extended or adjusted under 35 U.S.C. 154(b) by 289 days.

(21) Appl. No.: 10/717,586

(22) Filed: Nov. 21, 2003

(65) Prior Publication Data

US 2004/0116644 A1 Jun. 17, 2004

(30) Foreign Application Priority Data

Nov. 28, 2002 (JP) ............... 2002-345344

(51) Int. Cl.
C08G 59/50 (2006.01)
C08L 63/00 (2006.01)
C09D 163/00 (2006.01)

(52) U.S. Cl. ............ 523/415; 523/414; 523/417; 525/454; 525/528; 528/73; 528/93; 528/120; 528/121; 528/229

(58) Field of Classification Search ............... None
See application file for complete search history.

(56) References Cited

U.S. PATENT DOCUMENTS 4,101,497 A * 7/1978 Charves et al. ............ 523/454
4,108,842 A * 8/1978 Konig et al. ............... 528/61
4,148,950 A * 4/1979 Brindell et al. ............ 427/386
4,242,410 A * 12/1980 Konig et al. ............ 428/319.7
4,353,819 A * 10/1982 McFadden ................ 523/454
4,895,883 A * 1/1990 Pedain et al. .............. 521/159
5,068,402 A * 11/1991 Pedain et al. .............. 560/331
6,037,435 A * 3/2000 Hayashi et al. ............ 528/103
6,271,333 B1 * 8/2001 Okuhira ...................... 528/28

FOREIGN PATENT DOCUMENTS

JP 7-292059 7/1995
JP 2000-345055 12/2000
JP 2002-235067 A1 8/2002

OTHER PUBLICATIONS

Hiroshi Kakiuchi, "New Expoxy Resin (first edition)", Shoko-do Publishing Company, Sep. 20, 1986, pp. 183-185.

* cited by examiner

*Primary Examiner*—David J. Buttner
(74) *Attorney, Agent, or Firm*—Rader, Fishman & Grauer PLLC

(57) ABSTRACT

An amine curing component which can be used with various types of prepolymers including a urethane prepolymer having a reactive functional group of highly reactivity is provided. Also provided is a curable resin composition containing such curing component. This curable resin composition exhibits good surface and depth curability in the curing, and adjustment of pot life is also easy. The curing component contains an amino group-containing compound (A), a ketone compound (B), a ketimine compound (C), and water (D), and the curable resin composition contains this curing component.

14 Claims, 1 Drawing Sheet

CURING COMPONENT AND CURABLE RESIN COMPOSITION CONTAINING THE CURING COMPONENT

FIELD OF THE INVENTION

This invention relates to a two-part moisture curable resin composition. More specifically, this invention relates to an amine curing component which can be used for a prepolymer such as a urethane prepolymer with which practical use of an amine curing agent has been difficult, and use of which in a two part moisture curable resin composition results in excellent surface and depth curability of the composition, and use of which enables easy regulation of the pot life; as well as a curable resin composition containing such amine curing component.

BACKGROUND OF THE INVENTION

Room temperature-curable resin compositions are generally classified into two categories, namely, one-part moisture curable-compositions (one-part compositions) and two-part moisture curable compositions (two-part compositions). In the case of a one-part moisture curable composition, the prepolymer and the cross linking agent which are necessary for curing are stored in the same container, and the composition starts curing upon exposure to moisture. On the other hand, in the case of a two-part room temperature-curable composition, the prepolymer which constitutes the main part and the curing agent are stored in separate containers, and the curing starts when these two parts are mixed. Since the main part and the curing agent which are necessary for the curing are stored separately from each other in a two-part composition, the composition enjoys excellent long term storage stability and use of a highly reactive compound for the curing agent is allowed. In addition, since the two parts, namely, the main part and the curing agent are mixed immediately before use, the resin composition enjoys both the surface curability and the depth curability which are better than those of the one-part composition. While the one-part composition has advantage in the handling convenience since the components required for the curing are stored in one container in the ready-to-use state, its storage stability is clearly inferior to the two-part composition. In addition, the one-part composition is inferior in the surface curability and depth curability compared to the two-part composition since use of a highly active cross linking agent (curing agent) is prohibited.

The two-part curable composition comprises the main part and the curing agent. However, the type of the curing agent that can be used in a particular curable composition is limited by the type of the prepolymer used for the main part. For example, when a urethane prepolymer is used for the main part, the curing agent selected is often a polyol compound or an aromatic amine compound which has a relatively low reactivity since use of an aliphatic amine curing agent having a highly reactive active hydrogen results in the rapid reaction of the curing agent with the isocyanate group of the urethane prepolymer, and exothermic reaction, geleation, and the like are likely to take place in a period as short as several seconds making the required stirring difficult to be carried out.

When an epoxy resin is used for the main part, the curing agent used may be selected from a wide variety of curing agents including the highly reactive aliphatic amine curing agent and thiol group-containing curing agent since epoxy group is not so reactive at room temperature. Use of an aliphatic amine curing agent having a high curability is then a practical choice and use of other curing agent is not very popular.

However, use of an amine curing agent is impractical not only when the urethane prepolymer is the only prepolymer of the main component but also when both the urethane prepolymer and the epoxy resin are used for the prepolymers due to the abrupt reaction of the amine curing agent with the urethane prepolymer. While such problem may be solved by the use of an amine latent curing agent (for example, see JP 2002-235067 A [the term "JP XX-XXXXXX A" as used herein means an "unexamined published Japanese patent application"]), a latent curing agent presents active hydrogen only after its hydrolysis which proceed at a quite low speed detracting from the excellent depth curability unique to the two-part resin composition. Another way of overcoming such challenge is use of an amine adduct which had been formed by reacting an epoxy resin with an excessive amount of polyamine for the curing agent of various prepolymers. An amine adduct, however, is a highly viscous substance due to its high molecular weight, and it suffers from extremely poor mixing workability. In addition, blend ratio of the amine adduct with the prepolymer is not alterable since an amine adduct should be blended at a proportion equivalent to the isocyanate group of the urethane prepolymer. Accordingly, use of an amine adduct had the drawback of the unchangeable blend ratio between the urethane prepolymer and the epoxy resin (for example, see Hiroshi KAKIUCHI, "New Epoxy Resin [first edition]", Japan, Shoko-do Publishing Company, Sep. 20, 1986, p.183–185). In view of the situation as described above, a strong demand exists for a curing agent or a curing component which can be used with a urethane or other prepolymer that has a highly reactive functional group, and which can be used with any two or more prepolymers.

SUMMARY OF THE INVENTION

An object of the present invention is to provide a curing component for a two-part moisture curable resin composition use of which results in excellent surface and depth curability as well as good mixing workability of the resin composition, and which enables easy adjustment of the pot life of the resin composition even when the prepolymer of the main part of the resin composition comprises at least one member selected from a urethane prepolymer, an epoxy resin, a polyalkylene polyol having reactive silyl group and the like. Another object of the present invention is to provide a curable resin composition containing such curing component for the curing agent.

(1) This invention provides a curing component containing an amino group-containing compound (A), a ketone compound (B), a ketimine compound (C), and water (D).

(2) Also provided is the curing component according to the above (1) wherein coexistence of the amino group-containing compound, the ketone compound, the ketimine compound, and the water in said curing component is realized by mixing the amino group-containing compound (A) and the ketone compound (B).

(3) Also provided is the curing component according to the above (1) wherein coexistence of the amino group-containing compound, the ketone compound, the ketimine compound, and the water in said curing component is realized by mixing the ketimine compound (C) and the water (D).

(4) Also provided is the curing component according to the above (1) wherein coexistence of the amino group-containing compound, the ketone compound, the ketimine compound, and the water in said curing component is realized by mixing at least three member selected from the amino group-containing compound (A), the ketone compound (B), the ketimine compound (C), and the water (D).

(5) Also provided is the curing component according to any one of the above (1) to (4) wherein molar ratio (C=N/NH$_2$) of functional groups between total ketimine groups (C=N) to total amino groups (NH$_2$) is in the range of 90/10 to 3/97.

(6) This invention also provides a curable resin composition containing the curing component of any one of the above (1) to (5) as a curing agent.

(7) Also provided is the curable resin composition according to the above (6) wherein a prepolymer of a main part of the curable resin composition is a urethane prepolymer.

(8) Also provided is the curable resin composition according to the above (6) wherein a prepolymer of a main part of the curable resin composition is an epoxy resin.

(9) Also provided is the curable resin composition according to the above (6) wherein prepolymers of a main part of the curable resin composition are a urethane prepolymer and an epoxy resin.

(10) Also provided is the curable resin composition wherein the main part of the curable resin composition of any one of the above (7) to (9) contains a prepolymer other than the urethane prepolymer or the epoxy resin.

(11) Also provided is the curable resin composition according to any one of the above (7), (9) and (10) wherein isocyanate group at an end of the urethane prepolymer is bonded to a secondary or tertiary carbon atom.

The present invention relates to a curing component which can be used for the curing agent of a two-part moisture curable resin composition, and its characteristic feature is the coexistence of an amino group-containing compound (A), a ketone compound (B), a ketimine compound (C), and water (D) in the curing component which is realized by the equilibrium relationship between these (A) to (D). The resin composition of the present invention including such curing component for the curing agent has the merit of easy adjustment of the pot life after mixing the main part and the curing agent. In the present invention, regulation of the pot life, which had been accomplished in the conventional curable resin composition by adjusting the content of various components of the resin composition such as the curing agent and the curing catalyst can be accomplished, by simply varying the existence ratio of the curing component of the present invention. Mixing workability is also satisfactory, and gelation immediately after the mixing of the two parts as well as temperature elevation during the mixing are avoided. The resin composition of the present invention also exhibits good surface curability, and the surface curing time is within practical range. In addition, despite such sufficient pot life and excellent surface curability, the resin composition of the present invention retains the good depth curability unique to the two-part resin composition.

The coexistence of the four components (A) to (D) may be realized either by using the two components (A) and (B), or the two component (C) and (D) for the starting materials, or alternatively, by using any three components selected from (A) to (D) or all four components for the starting materials. Therefore, when the curing component of the present invention is used, a wider choice for the curing agent as well as easier control of the pot life are enabled. In addition, when a resin composition is produced by using the curing component of the present invention, the prepolymer used for the main part of the resin composition is not particularly limited, and not only the prepolymers which could be used with an amine curing agent but use of prepolymers which had been difficult to use with an amine curing agent has been enabled with no particular limitation. Accordingly, the curing component of the present invention accelerates development of a novel curable resin composition by new combination of prepolymers. Furthermore, the resin composition containing the curing component of the present invention is quite useful as a sealing material for construction purpose, coating composition, primer, sealing material for automobile and ship building, adhesive, water repellent material, filler, and the like.

DETAILED DESCRIPTION OF THE INVENTION

Next, the curable resin composition of the present invention is described in detail.

The curing component included in the curable resin composition of the present invention is a curing component which can be used as a curing agent of a two-part moisture curable resin composition regardless of the type of the prepolymer constituting the main part (This curing component is hereinafter referred to as the curing component of the present invention). Use of such curing component of the present invention enables provision of the two-part moisture curable resin composition (which is hereinafter referred to as the resin composition of the present invention). In the curing component of the present invention, four components, namely, amino group-containing compound (A), ketone compound (B), ketimine compound (C), and water (D) are simultaneously present, namely, by the coexistence of components (A) to (D). When the curing component of the present invention is used for the curing agent to constitute the resin component of the present invention with the use of an appropriate main part, the amino group-containing compound (A) and the reactive functional group of the prepolymer constituting the main part becomes bonded to each other by a condensation reaction.

In the curing component of the present invention, the four components, namely, the amino group-containing compound (A), the ketone compound (B), the ketimine compound (C), and the water (D) are required to coexist as the components constituting the curing component. The term "coexistence" used herein designates the state that none of the substances (A) to (D) has been lost by reaction, volatilization, modification, and other causes. A typical example of such coexistence is the one realized by the equilibrium reaction shown in FIGS. 1A and 1B.

Figure 1A:
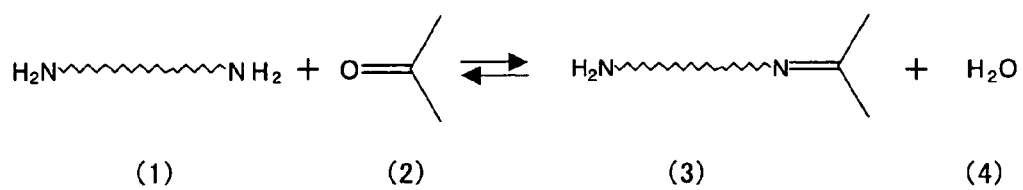
FIGS. 1A and 1B are views showing typical equilibrium reactions that form bases for the coexistence of various components of the curing component according to the present invention.

In the curing component of the present invention, the coexistence of the four components (A) to (D) can be realized by mixing an amino group-containing compound (A) 1 and a ketone compound (B) 2 on the bases of the equilibrium reaction shown in FIG. 1A (see Examples 1 to 4 as will be described below).

Figure 1B:
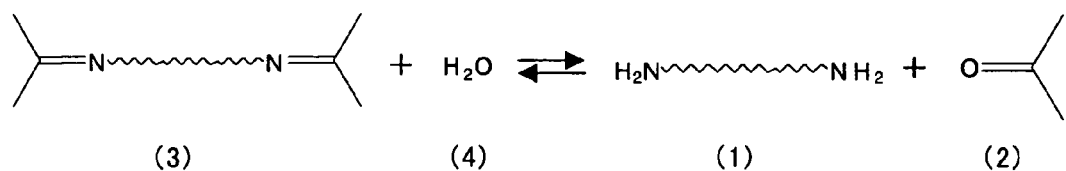

In the curing component of the present invention, the coexistence of the four components (A) to (D) may also be realized by mixing a ketimine compound (C) 3 and water (D) 4 on the bases of the equilibrium reaction shown in FIG. 1B (see Example 6 as will be described below).

Furthermore, in the curing component of the present invention, the coexistence of the four components (A) to (D) may also be realized by mixing any three or more components selected from the components (A) to (D) on the bases of the equilibrium reaction shown in FIGS. 1A and 1B (see Example 5 as will be described below).

In any of the cases as described above, the curing component can be used for the curing agent irrespective of whether the curing component has reached full equilibrium or not. To be more specific, when the amino group-containing compound (A) and the ketone compound (B) are used, the mixture is used after an appropriate time period so that the components (A) to (D) are in substantial coexistence. However, it is preferable to use the curing component as a curing agent when the components (A) to (D) are in equilibrium or in stable coexistence by the equilibrium relationship. This applies to other cases of the curing component of the present invention.

Figure 2A:
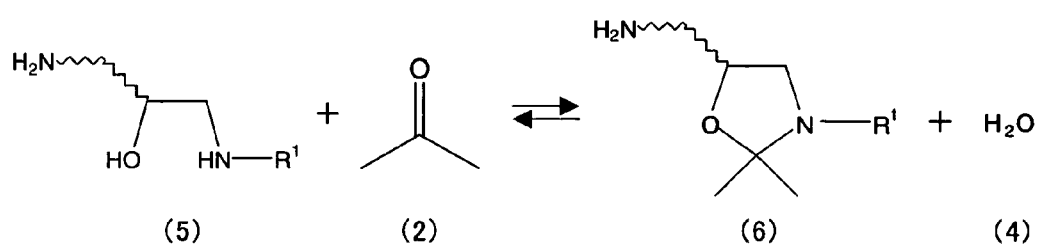
FIGS. 2A and 2B are views showing typical equilibrium reactions that form bases for the coexistence of various components of the curing component according to the present invention, when the ketimine compound (C) is substituted by an oxazolidine compound and an enamine compound, respectively.
Figure 2B:
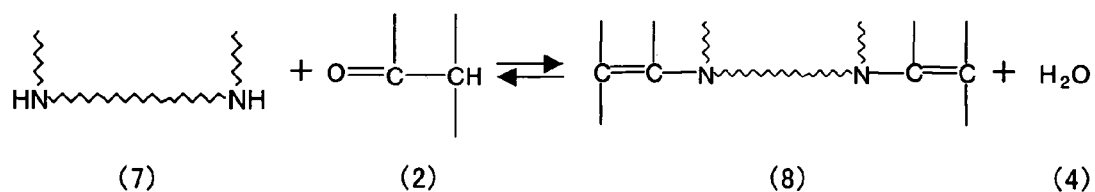

In the present invention, equivalent equilibrium reactions are estimated to take place when the ketimine compound (C) is replaced with an oxazolidine compound or an enamine compound. These equilibrium reactions are substantially the same as those of FIGS. 1A and 1B, and are within the scope of the present invention. Typical equilibrium reactions wherein the oxazolidine compound or the enamine compound is involved are shown in FIGS. 2A and 2B. In FIGS. 2A and 2B, an amino alcohol compound is indicated by the reference numeral "5", an oxazolidine compound is indicated by "6", an imino group-containing compound is indicated by "7", and an enamine compound is indicated by "8".

The amino group-containing compound (A) may also have a functional group other than the amino group. The amino group-containing compound (A) included in the curing component of the present invention is required to have at least one amino group, and may additionally have at least one functional group which is well known in the art. Exemplary such functional groups include ketimine group, imidazole group, oxazolidine group, enamine group, hydroxy group, mercapto group, and carboxy group, and also, hydrocarbon groups containing a halogen atom, sulfur atom (S), nitrogen atom (N), or oxygen atom (O). The amino group-containing compound may include at least one type of at least one such functional group, and the type and the number of the functional group are not particularly limited.

Among the functional groups other than the amino group, the preferred are ketimine group, oxazolidine group, and enamine group since these functional groups exhibit low reactivity with other components after the mixing of the (A) to (D) to form the curing component of the present invention, thereby realizing a favorable storage stability. More preferred are ketimine group and oxazolidine group since these functional groups exhibit adequately high reactivity with the prepolymer of the main part, and when the curing component of the present invention is used for the curing agent of the curable resin composition, the composition exhibits good mixing workability as well as excellent surface curability, and easy adjustment of the pot life is enabled.

The most preferable embodiment of the amino group-containing compound (A) is a polyamine having two or more amino groups wherein all amino groups except for one amino group undergoes a reaction with ketone compounds to become ketimine groups. In the case of such a compound, the reaction with the prepolymer of the main part proceeds at a high speed by the remaining one amino group while gradual hydrolysis of the ketimine bond (C=N) takes place with the emergence of the amino group. The easy adjustment of the pot life which is a feature characteristic to the resin composition of the present invention will then stand out when the components (A) to (D) of the curing component are used for the curing agents of the resin composition of the present invention.

Exemplary amino group-containing compounds (A) having such properties include ethylene diamine, propylene diamine, butylene diamine, pentamethylene diamine, hexamethylene diamine, heptamethylene diamine, octamethylene diamine, nonamethylene diamine, decamethylene diamine, undecamethylene diamine, dodecamethylene diamine, tetradecamethylene diamine, hexadecamethylene diamine, diethylenetriamine, triethylene triamine, triethylene tetramine, tetraethylene pentamine, pentaethylene hexamine, trimethylhexamethylene diamine, diethylaminopropylamine, N-aminoethylpiperazine, 1,2-diaminopropane, 1-amino-2,2-bis(aminomethyl)butane, tetraaminomethane, iminobispropylamine, methyliminobispropylamine, polyamideamine, 2,5-dimethyl-2,5-hexamethylene diamine, 1,4-bis(2-amino-2-methylpropyl)piperazine, bishexamethylene triamine, a polyether polyol having amino group at its end (PPG), 1,5-diamino-2-methylpentane, metaxylene diamine (MXDA), and other aliphatic polyamine compounds; isophorone diamine, 1,4-diaminocyclohexane, 1,3,5-triaminocyclohexane, menthene diamine, 4,4'-methylenebiscyclohexylamine, 1,3-bisaminomethylcyclohexane, 1-cyclohexylamino-3-aminopropane, bis(4-amino-3-methylcyclohexyl)methane, 3-aminomethyl-3,3,5-trimethyl-cyclohexylamine, a diamine having norbornane skeleton, 3,9-bis(3-aminopropyl)-2,4,8,10-tetraspiro[5.5]undecane (ATU), and other alicyclic polyamine compounds; phenylene diamine, metaphenylene diamine, diaminodiphenylmethane, diaminodiphenylsulfone, tolylene diamine, xylylene diamine, 2,4-diaminoanisole, 2,4-toluene diamine, and other aromatic polymamine compounds; aliphatic and aromatic polyamide amines, polyamines, urethane amines, and the like.

Also included are polyamine compounds having three or more functional groups including 1,1,1-tris(2'-aminomethyl) ethane, tetrakis(2'-aminomethyl)methane, 1,1,1-tris(2'-aminoethyl)ethane, tetrakis(2'-aminoethyl)methane, 1,1,1-tris(2'-aminopropyl)ethane, tetrakis(2'-aminopropyl)methane, 1,1,1-tris(2'-aminobutyl)ethane, tetrakis(2'-aminobutyl) methane, 1,2,3-tris(aminomethyl)benzene, 1,2,4-tris(aminomethyl)benzene, 1,3,5-tris(aminomethyl)benzene, and the like.

In addition to the exemplary compounds as mentioned above, the amino group-containing compound may also be the compound as described above which has been substituted also with a functional group other than the amino group. In the case of such compound, the compound may be substituted with at least one type of at least one functional group at any position other than that of the amino group.

Of the amino group-containing compounds as exemplified above, the preferred are those which are less sterically hindered around the amino group, for example, those wherein the carbon atom binding to the nitrogen atom of the amino group is the carbon atom constituting methylene ($—CH_2—$). The most preferred are a compound having an amino group-terminated polyether polyol skeleton, a diamine having norbornane skeleton, and an alicyclic diamine since, when such amino group-containing compounds reacts with a ketone compound to generate a ketimine compound, the resulting ketimine compound has good stability enabling a long-term storage stability to be realized, and the hydrolysis with water proceeds without delay. It is to be noted that the amino group-containing compound (A) used may be either a single compound or a combination of two or more compounds.

The ketone compound (B) which is used in the present invention is a compound which is capable of reacting with the amino group-containing compound (A) to form ketimine bond, whereby the resulting ketimine compound reacts with water to become decomposed and again form the amino group-containing compound (A) and the ketone compound (B). In this case, the amino group and the carbonyl group which are directly involved in the reaction may be either those from different compounds or those from the same compound. In other words, in the present invention, the amino group in the amino group-containing compound (A) and the carbonyl group in the ketone compound (B) may be present either in the compounds different from each other or in the same compound. Therefore, the amino group-containing compound (A) and the ketone compound (B) may be either mutually different compounds or the same compound.

The ketone compound (B) used in the present invention is a compound which has at least one carbonyl group in the molecule. Preferably, the ketone compound (B) is a compound wherein the side chain bonded to the carbon atom forming the carbonyl group (C=O) has a saturated or unsaturated aliphatic hydrocarbon group containing 1 to 20 carbon atoms which is optionally substituted with a substituent, an alicyclic hydrocarbon group containing 3 to 20 carbon atoms which is optionally substituted with a substituent, or an aromatic hydrocarbon group containing 6 to 20 carbon atoms which is optionally substituted with a substituent. These compounds may also contain atoms such as nitrogen, oxygen, sulfur, phosphor, or silicon which are shown in the periodic table in addition to the carbon and hydrogen atoms.

The ketone compound (B) included in the curing component of the present invention may be any ketone compound well known in the art. Exemplary ketone compounds (B) include methyl ethyl ketone (MEK), methyl isobutyl ketone (MIBK), acetone, diethyl ketone, dipropyl ketone, dibutyl ketone, diisobutyl ketone, methyl t-butyl ketone (MTBK), methyl isopropyl ketone (MIPK), diisopropyl ketone, methyl cyclohexyl ketone, ethyl butyl ketone, methyl octyl ketone, dioctyl ketone, cyclohexanone, methylcyclohexanone, methyl cyclohexyl ketone, methoxymethyl butyl ketone, methyl cyclohexinyl ketone, aryl methyl ketone, acetophenone, methyl amyl ketone, ethyl amyl ketone, propiophenone, and benzophenone, which may be used alone or in combination of two or more. The ketone compound (B) is not limited to such compounds.

Among the exemplified ketone compounds, the preferred are acetone, MEK, diethyl ketone, MIBK, and MIPK, and the more preferred are acetone, MEK, MIBK, and MIPK since these ketone compounds exhibits good reactivity with many types of amino group-containing compound (A), and quickly reacts with the amino group-containing compound (A) to realize the coexistence of the four components (A) to (D).

The ketimine compound (C) included in the curing component of the present invention is a compound having at least one ketimine bond (C=N) in its molecule. The ketimine bond is generated by the dehydration reaction between a compound having ketone group (C=O) such as an aldehyde or a ketone compound and the amino group ($-NH_2$). Therefore, the ketimine compound (C) of the present invention is generated from the amino group-containing compound (A) and the ketone compound (B) and there is no limitation for the combination of the amino group-containing compound (A) and the ketone compound (B). In other words, the ketimine compound is not particularly limited as long as it is the one derived from the two compounds that have been described for the amino group-containing compound (A) and the ketone compound (B). The ketimine compound used may be either a single compound or a combination of two or more compounds.

Typical combinations of the amino group-containing compound (A) and the ketone compound (B) include combinations of acetone with a diamine having polyether polyol skeleton, a diamine having norbornane skeleton, an isophorone diamine, a diamine having cyclohexane ring, a polyamide amine, or a urethane amine; combinations of methyl ethyl ketone with a diamine having polyether polyol skeleton, a diamine having norbornane skeleton, isophorone diamine, a diamine having cyclohexane ring, a polyamide amine, or a urethane amine; combinations of diethyl ketone with a diamine having polyether polyol skeleton, a diamine having norbornane skeleton, isophorone diamine, a diamine having cyclohexane ring, a polyamide amine, or a urethane amine; combinations of methyl isopropyl ketone with a diamine having polyether polyol skeleton, a diamine having norbornane skeleton, isophorone diamine, a diamine having cyclohexane ring, a polyamide amine, or a urethane amine; combinations of methyl t-butyl ketone with a diamine having polyether polyol skeleton, a diamine having norbornane skeleton, isophorone diamine, a diamine having cyclohexane ring, a polyamide amine, or a urethane amine; combinations of methyl isobutyl ketone with a diamine having polyether polyol skeleton, a diamine having norbornane skeleton, isophorone diamine, a diamine having cyclohexane ring, a polyamide amine, or a urethane amine; and the like.

Of the various possible combinations of the amino group-containing compound (A) and the ketone compound (B), the preferred are combinations wherein the ratio of the compounds (A) to (D) does not significantly change by the alteration in the temperature, pH, and the like. The four components (A) to (D) coexist on the bases of the equilibrium reaction and by depending on mutual concentrations. The surface curability, the depth curability, and the pot life can be adjusted by using the ratio of the total ketimine group to the total amino group ($C=N/NH_2$) in the curing component. As a consequence, adjustment of the pot life is quite easy under different temperatures, pH, and moisture conditions.

The water (D) used in the present invention is distilled water or a water having an equivalent purity produced by any method. When the water (D) is used as a starting material in producing the curing component of the present invention, the water in the atmosphere or the water included in (A) to (C) as an impurity or moisture content is not included in the water (D) except for the water included in the form of a hydrate of the (A) to (C). Water molecules are always present as an impurity in various substances, and full control of such water in the production of the curing component of the present invention is impossible. Therefore, the water which is controllable is treated as the water (D) of the present invention. In the meanwhile, in the equilibrium reactions shown in FIGS. 1A and 1B forming bases for the coexistence of the four components (A) to (D), the uncontrollable water is also included within the water constituting the equilibrium state as long as the water is involved in the equilibrium relation.

In the curing component of the present invention, the molar ratio ($C=N/NH_2$) of the total amino group ($NH_2$) to the total ketimine group ($C=N$) is preferably in the range of 90/10 to 3/97. When the ratio is within such range, the characteristic feature of the present invention, namely, the excellent surface curability and depth curability and easy adjustment of the pot life is not impaired regardless of the type of the prepolymer used. More preferably, the ratio $C=N/NH_2$ is in the range of 80/20 to 20/80 since the curing component having the ratio within such a range will enjoy the characteristic feature as described above, and in addition, compatibility with an even greater varieties of prepolymers. The $C=N/NH_2$ ratio may be adjusted by changing the amount of the ketone compound (B) added in relation to the amino group-containing compound (A) within the molar ratio allowing the stable coexistence of (A) to (D). The term amino group used herein designates all of the amino group included in the curing component comprising (A) to (D), and when the amino group is present in the ketone compound or the ketimine compound, such amino group is also counted in the denominator of the ratio $C=N/NH_2$. Similarly, the term ketimine group designates all of the ketimine group included in the curing component comprising (A) to (D).

The presence of the (A) to (D) may be confirmed by a method known in the art, for example, $^1$H-NMR, $^{13}$C-NMR, gas chromatography (GC), IR, and ultraviolet absorption spectrum which may be used alone or in combination of two or more. Use of these methods in combination will provide a more reliable evidence of the presence of these four components (A) to (D).

The prepolymer used in the main part of the curable resin composition wherein the curing component of the present invention may be used for the curing agent is not particularly limited. Exemplary prepolymers used include polyurethane resin (urethane prepolymer), epoxy resin, mixed resin of polyurethane resin and epoxy resin, silicone resin, terminal silyl group-containing resin ("modified silicon sealant materials"), terminal silyl group-containing resin/epoxy resin, special terminal silyl group-containing resin/epoxy resin, reactive acrylic resin, polysulfide resin, acrylic resin, and acryl urethane resin. The resin used in the main part of the curable resin composition of the present invention is not particularly limited, and the resin may be used either alone or in combination of two or more.

Of the prepolymers as mentioned above, the preferred are polyurethane resin and a mixture of the polyurethane resin with epoxy resin. When such prepolymer is used in a curable resin composition and reacted with a conventional amine curing agent, reaction of the amine curing agent with the reactive functional group of the prepolymer proceeded abruptly and the pot life had been far from being sufficient. In contrast, use of the curing component of the present invention realizes a pot life of practically sufficient level as well as easy adjustment of the pot life, and the adjustment of the pot life can be accomplished depending on the weather, temperature, moisture, and various limitations affects the working time. Use of the curing component of the present invention also enables simultaneous use in the main part of two or more prepolymers each having a different reactive functional group, and development of a curable composition having unknown properties is thereby enabled.

The urethane prepolymer which may be included in the main part of the curable resin composition of the present invention is a compound having at least one isocyanate group (NCO) on its end. Introduction of such isocyanate group can be accomplished by an addition of a compound having isocyanate group to the polyol compound which will constitute the principal chain of the urethane prepolymer. Any method well known in the art may be used for such introduction of the isocyanate group in the polyol compound.

Exemplary compounds which may constitute the principal chain of the urethane prepolymer include polyol compounds such as polyether polyol, polyester polyol, polymer polyol, ether ester polyol, acryl polyol, phosphor-containing polyol, halogen-containing polyol, and polybutadiene polyol. Among these, the preferred are polyether polyol, polyester polyol, and acryl polyol in view of the availability of the compound, cost, the reactivity with the isocyanate group-containing compound, and the like.

The polyol compound used for the principal chain of the urethane prepolymer may preferably have an average molecular weight of 500 to 20,000, and more preferably, 1,000 to 10,000. When the average molecular weight is within such range, the cured resin composition will enjoy adequate modulus, while avoiding the brittleness caused by a high degree of cross linking due to the excessively low molecular weight or unduly long surface curing time caused by slow progress of the curing reaction due to the excessively high molecular weight.

The isocyanate group-containing compound used for synthesizing the urethane prepolymer may be any of those well known in the art as long as it has isocyanate group available for the reaction provided by the reaction with the terminal hydroxy group of a polyol compound. Exemplary such compounds include MDI such as 4,4'-diphenylmethane diisocyanate, 2,4'-diphenylmethane diusocyanate, and $H_{12}$MDI; TDI such as 2,4-tolylene diisocyanate and 2,6-tolylene diisocyanate; aromatic polyisocyanates such as naphthalene-1,5-diisocyanate (NDI), tolidine diisocyanate (TODI), xylylene diisocyanate (XDI), $H_6$XDI, p-phenylene diisocyanate, tetramethylxylylene diisocyanate (TMXDI), triphenylmethane triisocyanate, toluene diisocyanate, 1,3-bis-(1-isocyanate-1-methylethyl)-benzene, 1,4-bis-(1-isocyanate-1-methylethyl)-benzene, 1,3-bis-(1-isocyanate methyl)-benzene, 1,5-dimethyl-2,4-bis-(isocyanate-methyl)-benzene, 1,5-dimethyl-2,4-bis-(isocyanate ethyl)-benzene, 1,3,5-triethyl-2,4-bis-(isocyanate methyl)-benzene, and 3,3'-dimethyl-4,4'-diisocyanate diphenylmethane; aliphatic polyisocyanates such as ethylene diisocyanate, propylene diisocyanate, 2,3-butylene diisocyanate, hexamethylene diisocyanate (HDI), octamethylene diisocyanate, dodecamethylene diisocyanate, ω,ω'-dipropylether diisocyanate, lysine diisocyanate (LDI), and trimethylhexamethylene diisocyanate (TMDI); alicyclic polyisocyanates such as isophorone diisocyanate (IPDI), cyclopentene diisocyanate, cyclohexane diisocyanate, trans-cyclohexane-1,4-diisocyanate, 4-methyl-1,3-diisocyanate cyclohexane, dicyclohexyl-methane-4,4'-diisocyanate, and 3,3'-dimethyl-dicyclohexyl-methane-4,4'-diisocyanate; diisocyanate (NBDI) having norbornane skeleton; and the like.

Of these isocyanate group-containing compounds, the preferred are MDI, TDI, XDI, TMXDI, IPDI, and NBDI in view of the low cost and high availability since these are resins commercially produced in a relatively large amount, and also in view of the high reactivity with the polyol compound constituting the principal chain of the urethane prepolymer which results in the high uniformity of the resulting prepolymer. In addition, since the curing agent used in the resin composition of the present invention is an amine curing agent, the favorable surface curability and depth curability characteristic to the present invention are not impaired irrespective of the type of the isocyanate group-containing compound used for the starting material in synthesizing the urethane prepolymer. The isocyanate group-containing compound may be used either alone or in combination of two or more types of compounds per one type of the polyol compound used in the synthesis of one type of the urethane prepolymer.

Of the isocyanate group-containing compounds as described above, the most preferred are those having the isocyanate group bonded to the secondary or tertiary carbon atom since when water is mixed with an isocyanate group-containing compound that has stronger reactivity, the water would be used for a reaction with the isocyanate group and therefore would not be used to hydrolyze the ketimine compound. Exemplary such isocyanate group-containing compounds include tetramethylxylylene diisocyanate (TMXDI) and isophorone diisocyanate (IPDI).

In the resin composition of the present invention, the urethane prepolymer may be used either alone or in combination of two or more. Exemplary such urethane polymers include MDI urethane prepolymer, TMXDI urethane prepolymer, TDI urethane prepolymer, TODI urethane prepolymer, XDI urethane prepolymer, HDI urethane prepolymer, LDI urethane prepolymer, IPDI urethane prepolymer, TMDI urethane prepolymer, and NBDI urethane prepolymer, which may be used either alone or in combination of two or more. The preferred are MDI urethane prepolymer and TMXDI urethane prepolymer. These prepolymers exhibit low hydrolyzability of the terminal isocyanate group, and therefore, exothermic reaction and foaming of the resin composition during the curing is suppressed even when the curing component of the present invention contains the amino group-containing compound (A) at a high proportion.

When a urethane prepolymer is used for the main part of the resin composition of the present invention, a prepolymer (resin) other than the urethane prepolymer may be used with the urethane prepolymer. Exemplary such prepolymers other than the urethane prepolymer include epoxy resin, silicone resin, terminal silyl group-containing resin, polysulfide resin, acryl resin, and acryl urethane resin. Among these, the preferred are epoxy resin and terminal silyl group-containing resin since the reaction of these resins with the curing component of the present invention is equivalent to the reaction of the urethane prepolymer with the curing component of the present invention and the cured resin composition will fully retain the properties inherent to the resins used. Such prepolymer other than the urethane prepolymer may be used alone or in combination of two or more.

As described above, when the urethane prepolymer is used for the main part of the resin composition of the present invention, various prepolymers well known in the art may be used together with the urethane prepolymer. In such a case, the urethane polymer (U-NCO) and the prepolymer other than the urethane prepolymer (non-NCO) may be incorporated at a ratio of the non-NCO/U-NCO of 95/5 to 0/100 by weight. When the urethane and non-urethane prepolymers are used at a ratio within such a range, the curing component of the present invention uniformly reacts with both the urethane prepolymer and the non-urethane prepolymer and the resin composition will enjoy the good balance between the surface and depth curability and the mixing workability characteristic to the resin composition of the present invention.

The epoxy resin used for the prepolymer of the resin composition of the present invention is a compound having at least two epoxy groups acting as the reactive functional groups at the terminal of the molecule.

Exemplary epoxy resins (compounds) include bisphenol A epoxy resin, bisphenol F epoxy resin, bisphenol S epoxy resin, phenol novolac epoxy resin, o-cresol novolac epoxy resin, cycloaliphatic epoxy resin, triglycidyl isocyanurate (TGIC); and more specifically, compounds obtained by epoxidating the novolac resin obtained by condensing or co-condensing a phenol such as phenol, cresol, xylenol, resorcin, cathecol, bisphenol A, or bisphenol F, and/or a naphthol such as α-naphthol, β-naphthol, or dihydroxynaphthalene with a formyl group-containing compound such as formaldehyde, acetaldehyde, propionaldehyde, benzaldehyde, or salicylaldehyde in the presence of an acidic catalyst; diglycidylethers of bisphenol A, bisphenol F, bisphenol S, an alkyl-substituted or unsubstituted biphenol, or stilbene phenol; glycidyl ethers of an alcohol such as butanediol, polyethylene glycol, or polypropylene glycol; glycidyl esters of a carboxylic acid such as phthalic acid, isophthalic acid, or tetrahydrophthalic acid; glycidyl or methylglycidyl epoxy resins wherein active hydrogen bonded to nitrogen atom in aniline, isocyanuric acid or the like has been substituted with glycidyl group. Among such epoxy resins, the preferred are bisphenol A epoxy resins, phenol novolac epoxy resins, and bisphenol F epoxy resins. The epoxy resin may be used either alone or in combination of two or more.

Also included within such epoxy resins are those having on its hydrocarbon-based skeleton a functional group containing an atom such as halogen, oxygen, sulfur, nitrogen, phosphor, or silicon; and to be more specific, a halogen atom, ether group, ester group, acyl group, formyl group, carbonyl group, carboxy group, hydroxy group, amino group, imino group, anilide group, nitro group, thiol group, thioether group, phosphate group, or azide group. The epoxy resin may preferably have an average molecular weight of 180 to 5,000 since handling of the epoxy resin higher molecular weight is difficult due to the excessively high viscosity while an epoxy resin with a lower molecular weight will result in a brittle cured resin composition.

When an epoxy resin used for the main part of the present invention, a prepolymer other than the epoxy resin may be used together with the epoxy resin. Exemplary such prepolymers other than the epoxy resin include urethane prepolymer (polyurethane resin), silicone resin, terminal silyl group-containing resin, polysulfide resin, acryl resin, and acryl urethane resin. Among these, the preferred are urethane prepolymer and terminal silyl group-containing resin since the reaction of these resins with the curing component of the present invention is equivalent to the reaction of the epoxy resin with the curing component of the present invention and the cured resin composition will fully retain the properties inherent to the resins used. Such prepolymer other than the epoxy resin may be used alone or in combination of two or more.

In the resin composition of the present invention, the prepolymer (non-Epo) other than the epoxy resin (Epo) may be incorporated as a prepolymer at a ratio of the non-Epo/Epo of 95/5 to 5/95 by weight. When the epoxy resin and the non-epoxy resin are used at a ratio within such a range, the resin composition will retain the properties inherent to the epoxy resin including the good heat resistance, high chemical resistance, and flexibility.

The resin composition of the present invention may include both the urethane prepolymer and the epoxy resin as the prepolymers constituting the main part. The urethane prepolymer and the epoxy resin have the properties as described above, and may be those produced from the starting materials as described above. When the urethane prepolymer (U-NCO) and the epoxy resin (Epo) are simultaneously used, the ratio of these polymers by weight (U-NCO/Epo) may be in the range of 100/0 to 0/100, and the ratio may be varied within such ratio depending on the intended used of the resin composition. Furthermore, if a prepolymer other than the urethane prepolymer or the epoxy resin is incorporated in the main component, the proportion of such prepolymer in the total prepolymer is preferably in the range of 1 to 50 by weight.

In the curable resin composition of the present invention, the prepolymer that can be incorporated in the main part of the resin composition other than the urethane prepolymer and the epoxy resin are not particularly limited. Exemplary such prepolymers include silicone resin, terminal silyl group-containing resin, special terminal silyl group-containing resin, reactive acrylic resin, polysulfide resin, acryl resin, and acryl urethane resin. The type of the resin included in the main part of the curable resin composition of the present invention is not particularly limited, and the resin may be used either alone or in combination of two or more.

The resin composition of the present invention may have added thereto various additives known in the art to the extent that the advantageous properties of the present invention is not impaired. Exemplary such additives include a filler, plasticizer, curing catalyst, thixotropic agent, dehydrator, softening agent, stabilizer, colorant, anti-sagging agent, physical property-adjusting agent, flame retardant, reinforcing agent, antiaging agent, antioxidant, ultraviolet absorbent, dye, pigment, and solvent. The additives may be added to either one or both of the main part and the curing agent of the two-part moisture curable resin composition of the present invention irrespective of the type and the amount of the additive.

The resin composition of the present invention may have incorporated therein a filler well known in the art. The filler has been incorporated generally in consideration of thermal expansion coefficient, modulus, heat conductivity, mechanical strength, flame retardancy, electric properties, chemical resistance, heat resistance, abrasive resistance, filling property and the like of the resulting resin composition after curing. In the resin composition of the present invention, the type and the amount of the filler added may be varied according to the intended use of the resin composition, and the filler is preferably added at an amount of 0.1 to 500 parts by weight per 100 parts by weight of the total prepolymer of the main part by considering the influence of the filler addition on the properties of the cured resin composition as mentioned above.

Exemplary fillers which may be blended include asbestos, alumina, attapulgite, volcanic ash, shirasu balloon, carbon black, graphite, silicate fine powder, calcium silicate, diatomaceous earth, magnesium oxide, titanium oxide, iron oxide, magnesium hydroxide, aluminum hydroxide, slate powder, cerussite, quartz powder, molten silica powder, boron nitride, calcium carbonate, magnesium carbonate, talc, feldspar powder, molybdenum dioxide, barite, white carbon, mica, kaolin clay, agalmatolite clay, gypsum, silica, nepheline, syenite, calcium hydroxide, barium borate, zinc borate, cryolite, lime stone, glass, bentonite, glass fiber, glass filament, ebonite powder, shellac, cork powder, bone powder, wood powder, and the like. Among these, the preferred are calcium carbonate, talc, clay, and silica. It is to be noted that these fillers may be used either alone or in combination of two or more.

A curing catalyst (condensation catalyst) known in the art may be used in the resin composition of the present invention. The curing catalyst is incorporated for the purpose of promoting the curing reaction between the resin constituting the main part and the curing agent, and in this curing reaction, a three dimensional network structure is formed by cross linking. The curing catalyst, however, is not a critical additive in the present invention in view of the surface curability, the pot life control and the like. In addition, incorporation of the curing catalyst in an excessive amount results in the problems such as reduced heat resistance and coloring of the cured resin composition, and accordingly, the curing catalyst is added in the resin composition of the present invention at an amount of not more than 5 parts by weight per 100 parts by weight of the total prepolymer.

Exemplary curing catalysts include metal catalysts such as dimethyltin dilaurate, dibutyltin dilaurate, dibutyltin maleate, dibutyltin diacetate, tin octylate, tin naphthenate, and other tin carboxylates; tetrabutyl titanate, tetrapropyl titanate, and other titanates; aluminium trisacethylacetonate, aluminium trisethylacetonate, diisopropoxy aluminium ethylacetonate, and other organoaluminium compounds; zirconium tetraacetylacetonate, titanium tetraacetylacetonate, and other chelate compounds; lead octanate, bismuth octanate, and other metal octanates; and the like as well as amine catalysts such as butylamine, octylamine, dibutylamine, triethylamine, N,N-dimethylcyclohexylamine, and other monoamines; N,N,N',N'-tetramethylethylene diamine, N,N,N',N'-tetramethylpropane-1,3-diamine, N,N,N',N'-tetramethylhexane-1,6-diamine, and other diamines; N,N,N',N'',N''-pentamethyldiethylenetriamine, N,N,N',N'',N''-pentamethyldipropylene triamine, and other triamines; N-methylmorpholine, N,N'-dimethylpiperazine, N-methyl-N'-(2-dimethyamino)-ethylpiperazine, and other cyclic amines; dimethyamino ethanol, dimethyaminoethoxyethanol, N,N,N'-trimethylaminoethylethanolamine, and other alcoholamines; bis(2-dimethylaminoethyl)ether, ethyleneglycol bis(3-dimethyl)aminopropylether, and other etheramines; and their salt compounds.

Among such curing catalysts, the preferred are metal catalysts such as tin carbonates and titanates since amine catalysts have amino group which may react with the reactive functional group of the prepolymer to inhibit the curing reaction between the prepolymer and the curing agent.

The resin composition of the present invention may have incorporated therewith any plasticizer which is well known in the art. Exemplary such plasticizers include dioctyl phthalate (DOP), dibutyl phthalate (DBP), diethyl phthalate (DEP), dimethyl phthalate (DMP), diisononyl phthalate (DINP), dinonyl phthalate (DNP), butylbenzyl phthalate (BBP), isodecyl phthalate (DIDP) and other phthalates; dioctyl adipate (DOA), isononyl adipate (DINA), dioctyl azelate (DOZ), dioctyl succinate (DOC), isodecyl succinate (IDS), isodecyl sebacinate (IDS), dibutyl sebacinate (DBS), diocrtyl sebacinate (DOS), butyl oleate, acetyl tributyl citrate (ATBC) and other aliphatic carbonates; pentaerythritolate, and other glycolates; trioctyl phosphate, tricresyl phosphate and other phosphates; epoxidated soy bean oil, epoxy benzyl stearate, and other epoxy plasticizers; polyester plasticizers; pine tar, linoleic acid, oleic acid, abietic acid, rapeseed oil, cottonseed oil, peanut oil, castor oil, palm oil, and other vegetable oils; extender, process oil, paraffin oil, naphthene oil, aromatic oil, and other mineral oils; and monoester, epoxy, chlorinated paraffin, ether, thioether, polyester, polyether, and other synthetic plasticizers. Among these plasticizers, the preferred are DINA, DOP, DOA, and DINP. It is to be noted that these plasticizers may be used either alone or in combination of two or more.

The curing component of the present invention can be used for the curing agent of a two-part moisture curable resin composition, and this curing component has a characteristic feature that four components, that is, the amino group-containing compound (A), the ketone compound (B), the ketimine compound (C), and the water (D) coexists in the curing component. The resin (prepolymer) with which the curing component may be used as a curing agent is not particularly limited, and the curing component of the present invention can be used with a urethane prepolymer or other prepolymer whose use with an amine curing agent had been impractical, or when two or more prepolymers are used in the main part. Accordingly, the curing component of the present invention is quite suitable for use in developing a new resin composition.

In the case of the two-part moisture curable resin composition using the curing component of the present invention for the curing agent, ketone which is the protective group of the amine leaves when it is exposed to the moisture in the atmosphere or water in the curing agent to generate the highly active amine, and curing reaction is thereby initiated. When the curing reaction is in progress, the amino group-containing compound (A) and the prepolymer of the main part undergo condensation by consuming the amino group-containing compound (A). However, the coexistence of the four components (A) to (D) is maintained by the equilibrium reaction, and equilibrium shifts so that the amino group-containing compound (A) consumed is compensated by such shifting in the equilibrium, and the amino group-containing compound (A) is constantly and stably supplied within the curing component thereby enabling constant progress of the curing reaction. While a resin composition enjoying a high surface curability and a good depth curability usually suffered from an insufficient pot life inherent to the two-part resin composition, pot life in the case of the present invention can be designed at a high freedom by controlling the molar ratio of the amino group to the ketimine group included in the four components of the curing component.

In addition, since the resin composition of the present invention is a two-part resin composition, it has the advantageous storage stability unique to a two-part resin composition. Accordingly, the curing component of the present invention and the resin composition produced by using such curing component have a wide variety of applications. Owing to the excellent properties as described above, the resin composition of the present invention is quite useful as a sealing material for construction purpose, coating composition, sealing material for automobiles, filler, adhesive, pigment, primer, and the like.

This application claims priority on Japanese patent application No.2002-345344, the contents of which are hereby incorporated by reference.

EXAMPLES

Next, the present invention is described in detail by referring to the Examples which by no means limit the scope of the invention.

Examples 1 to 6 and Comparative Examples 1 to 5

Compositions were produced by using the ingredients shown in Table 1, below at the amounts by weight indicated in Table 1. The main part and the curing agent were separately prepared, and a high viscosity blender was used for uniform dispersion of the ingredients. After confirming that the four components (A) to (D) were present in the curing agent by using $^1$H-NMR, the two parts, namely, the main part and the curing agent were mixed to promote the curing reaction under moist conditions to thereby evaluate workability in the mixing stage, curing time of the resin surface in the curing, and depth curability of the cured resin composition.

(1) Mixing Workability 180 g of the main part of the resin composition which had been prepared according to the composition shown in Table 1, below was mixed with the corresponding curing agent in a 500 ml plastic cup and the mixture was stirred with a spatula. The force required for the movement of the spatula was evaluated 10 minutes after the mixing of the two parts. The workability was evaluated "pass" when the spatula could be moved with a small force and "fail" when the spatula could not be moved due to the gelation.

(2) Measurement of the Surface Curing Time of the Resin Composition (Surface Curability)

Surface curing time of the resin composition was evaluated by measuring the time of surface tack disappearance after the start of the curing reaction of the resin composition, that is, by measuring the tack free time. A resin composition comprising the main part and the curing agent of the compositions as shown in Table 1, below was prepared. The two parts were mixed until the mixture was fully uniform, and the mixture was poured into a polyethylene flame of 5 cm (length)×5 cm (width)×5 cm (height) without forming any bubble. The upper surface in contact with the atmosphere was smoothed while preventing the contact of the side surfaces the atmosphere. This test specimen was kept at a temperature of 20° C. and humidity of 55%, and used as a standard for measuring the curing time. Next, the surface of the test specimen in contact with the atmosphere was gently touched with a polyethylene film to measure the time required until no tack was observed between the specimen and the film (tack free time) for use as the curing time of the resin surface. The tack free time is indicated by the unit of 10 minutes when it was less than 1 hour, and by the unit of 1 hour when it was 1 hour or longer.

(3) Evaluation of the Depth Curability of the Resin Composition

The depth curability was evaluated by using the specimen used in the above. (2) The specimen of the cured resin composition was cut with a knife together with the frame covering the specimen 24 hours after the start of the curing reaction. As in the case of the above (2), the cross section was gently touched with a polyethylene film, and the depth (mm) from the surface of the specimen which had lost its tack was measured to obtain the cure depth (depth curability). The cure depth is indicated "<1" when it was less than 1 mm, and ">10" when it was more than 10 mm.

TABLE 1

| | Ex. 1 | C. E. 1 | C. E. 2 | Ex. 2 | C. E. 3 | C. E. 4 | Ex. 3 | Ex. 4 | Ex. 5 | Ex. 6 | C. E. 5 |
|---|---|---|---|---|---|---|---|---|---|---|---|
| Main part | | | | | | | | | | | |
| MDI-terminated urethane prepolymer | 100 | 100 | 100 | | | | | | | | |
| TMXDI-terminated urethane prepolymer | | | | | | | 80 | 80 | 80 | 80 | 80 |
| Epoxy resin | | | | 100 | 100 | 100 | 20 | 20 | 20 | 20 | 20 |
| Calcium carbonate | 80 | 80 | 80 | 80 | 80 | 80 | 80 | 80 | 80 | 80 | 80 |
| Curing agent | | | | | | | | | | | |
| Jeffamine D230 | 7.7 | 7.7 | | | | | | | | | |
| NBDA | | | 20.1 | 20.1 | | | 8.1 | 8.1 | 8.1 | | 8.1 |
| Acetone | | | | 3.0 | | | 3.1 | 1.2 | 1.2 | | |
| MEK | 2.4 | | | | | | | | | | |
| Ketimine compound | | | 14 | | | 55 | | | | 22.2 | |
| Water | | | | | | | | | 0.5 | 2.0 | |
| Calcium carbonate | 50 | 50 | 50 | 50 | 50 | 50 | 50 | 50 | 50 | 50 | 50 |
| Plasticizer | 20 | 20 | 20 | 20 | 20 | 20 | 20 | 20 | 20 | 20 | 20 |
| Mixing workability | pass | fail | pass | pass | pass | pass | pass | pass | pass | pass | fail |
| Curability | | | | | | | | | | | |
| Surface curing time (hr) | 1 | — | 3 | 6 | 0.5 | 20 | 6 | 5 | 3 | 8 | — |
| Cured film thickness (mm) | >10 | — | <1 | >10 | >10 | <1 | >10 | >10 | >10 | >10 | — |

Ex.: Example
C. E.: Comparative Example

The MDI-terminated urethane prepolymer and the TMXDI-terminated urethane prepolymer used in Examples 1 to 6 and Comparative Examples 1 to 5 of Table 1 were synthesized by the procedure as described below. Other compounds used were commercially available products. The compounds used for the synthesis of the prepolymer were commercially available products.

(i) Synthesis of MDI-terminated Urethane Prepolymer

Diphenylmethane diisocyanate (MDI) (Cosmonate PH manufactured by Mitsui Chemicals, Inc.) and trifunctional polypropylene glycol (Excenol 5030 having an average molecular weight of 5,000 manufactured by Asahi Glass Co., Ltd.) were mixed at a ratio of NCO/OH of 2.0, and the mixture was heated to 70° C. and stirred for 8 hours to produce the MDI-terminated urethane prepolymer.

(ii) Synthesis of TMXDI-terminated Urethane Prepolymer

Tetramethylxylene diisocyanate (TMXDI) (TMXDI manufactured by Mitsui-Cytec, Ltd. [now Japan Cytec Industries]) and trifunctional polypropylene glycol (Exenol 5030 having an average molecular weight of 5,000 manufactured by Asahi Glass Co., Ltd.) were heated to 80° C. and stirred for 8 hours in the presence of dibutyl tin dilaurate catalyst to produce TMXDI-terminated urethane prepolymer.

Components in the Table

<<Main Part>>

MDI-terminated urethane prepolymer: MDI-terminated PPG (average molecular weight, 5,000)
TMXDI-terminated urethane prepolymer: TMXDI-terminated PPG (average molecular weight, 5,000)
Epoxy resin: Adeka Resin EP4100E manufactured by Asahi Denka Co., Ltd.
Calcium carbonate: Viscolite MBP manufactured by Shiraishi Calcium Kaisha, Ltd.

<<Curing Agent>>

Jeffamine D230: Jeffamine D230 manufactured by Sun Technochemicals Co., Ltd.
NBDA: NBDA manufactured by Mitsui Chemicals, Inc.
Dimethyl ketone: manufactured by Kanto Kagaku
Methyl ethyl ketone: manufactured by Kanto Kagaku
Ketimine compound: Epikure H-30 manufactured by Japan Epoxy Resins Co., Ltd.
Water: distilled water
Plasticizer: diisononyl adipate manufactured by mitsubishi Chemical corporation

What is claimed is:

1. A two-part curable resin composition comprising a main part and a curing component, said curing component containing an amino group-containing compound (A), a ketone compound (B), a ketimine compound (C), and water (D) as a curing agent, wherein the amino group-containing compound (A), the ketone compound (B), the ketimine compound (C), and the water (D) are in equilibrium or in stable coexistence by a equilibrium relationship, wherein a prepolymer of the main part is an epoxy resin, and wherein the main part and the curing component are separated from each other.

2. The two-part curable resin composition according to claim 1, wherein the main part contains a prepolymer other than the epoxy resin.

3. The two-part curable resin composition according to claim 1, wherein the coexistence of the amino group-containing compound (A), the ketone compound (B), the ketimine compound (C), and the water (D) in said curing component is realized by mixing the amino group-containing compound (A) and the ketone compound (B).

4. The two-part curable resin composition according to claim 1, wherein the coexistence of the amino group-containing compound (A), the ketone compound (B), the ketimine compound (C), and the water (D) in said curing component is realized by mixing the ketimine compound (C) and the water (D).

5. The two-part curable resin composition according to claim 1, wherein the coexistence of the amino group-containing compound (A), the ketone compound (B), the ketimine compound (C), and the water (D) in said curing component is realized by mixing at least three member selected from the amino group-containing compound (A), the ketone compound (B), the ketimine compound (C), and the water (D).

6. The two-part curable resin composition according to claim 1, wherein a molar ratio (C=N/NH$_2$) of functional groups between total ketimine groups (C=N) to total amino groups (NH$_2$) in the curing component is in the range of 90/10 to 3/97.

7. A two-part curable resin composition comprising a main part and a curing component, said curing component containing an amino group-containing compound (A), a ketone compound (B), a ketimine compound (C), and water (D) as a curing agent, wherein the amino group-containing compound (A), the ketone compound (B), the ketimine compound (C), and the water (D) are in equilibrium or in stable coexistence by a equilibrium relationship, wherein prepolymers of the main part are a urethane prepolymer and an epoxy resin, and wherein the main part and the curing component are separated from each other.

8. The two-part curable resin composition according to claim 7, wherein the main part contains a prepolymer other than the urethane prepolymer and the epoxy resin.

9. The two-part curable resin composition according to claim 7, wherein an isocyanate group at an end of the urethane prepolymer is bonded to a secondary or tertiary carbon atom.

10. The two-part curable resin composition according to claim 8, wherein an isocyanate group at an end of the urethane prepolymer is bonded to a secondary or tertiary carbon atom.

11. The two-part curable resin composition according to claim 7, wherein the coexistence of the amino group-containing compound (A), the ketone compound (B), the ketimine compound (C), and the water (D) in said curing component is realized by mixing the amino group-containing compound (A) and the ketone compound (B).

12. The two-part curable resin composition according to claim 7, wherein the coexistence of the amino group-containing compound (A), the ketone compound (B), the ketimine compound (C), and the water (D) in said curing component is realized by mixing the ketimine compound (C) and the water (D).

13. The two-part curable resin composition according to claim 7, wherein the coexistence of the amino group-containing compound (A), the ketone compound (B), the ketimine compound (C), and the water (D) in said curing component is realized by mixing at least three member selected from the amino group-containing compound (A), the ketone compound (B), the ketimine compound (C), and the water (D).

14. The two-part curable resin composition according to claim 7, wherein a molar ratio (C=N/NH$_2$) of functional groups between total ketimine groups (C=N) to total amino groups (NH$_2$) in the curing component is in the range of 90/10 to 3/97.

* * * * *